United States Patent
Arab et al.

(10) Patent No.: US 10,106,409 B2
(45) Date of Patent: Oct. 23, 2018

(54) METHOD FOR ACTIVATING $U_3O_8$ WITH A VIEW TO CONVERTING SAME INTO HYDRATED $UO_4$

(71) Applicant: AREVA NC, Courbevoie (FR)

(72) Inventors: Mehdi Arab, Bagnols sur Ceze (FR); Bertrand Morel, Saint-Paul Trois Chateaux (FR); Murielle Rivenet, Baiseux (FR)

(73) Assignee: AREVA NC, Courbevoie (FR)

( * ) Notice: Subject to any disclaimer, the term of this patent is extended or adjusted under 35 U.S.C. 154(b) by 58 days.

(21) Appl. No.: 15/119,906

(22) PCT Filed: Feb. 19, 2015

(86) PCT No.: PCT/EP2015/053520
§ 371 (c)(1),
(2) Date: Aug. 18, 2016

(87) PCT Pub. No.: WO2015/124682
PCT Pub. Date: Aug. 27, 2015

(65) Prior Publication Data
US 2017/0050847 A1   Feb. 23, 2017

(30) Foreign Application Priority Data

Feb. 19, 2014   (FR) ...................... 14 51330

(51) Int. Cl.
*C01G 43/01* (2006.01)
*C01B 15/047* (2006.01)
*C01G 43/00* (2006.01)
*C22B 3/00* (2006.01)

(52) U.S. Cl.
CPC .......... *C01B 15/0475* (2013.01); *C01G 43/00* (2013.01); *C01G 43/01* (2013.01); *C22B 3/00* (2013.01)

(58) Field of Classification Search
CPC ..... C01B 15/0475; C01B 43/00; C01B 43/01; C01G 43/00; C01G 43/01; C22B 3/00
See application file for complete search history.

(56) References Cited

U.S. PATENT DOCUMENTS

2013/0280157 A1* 10/2013 Morel ................. C01B 15/0475
423/260

FOREIGN PATENT DOCUMENTS

| EP | 0 092 475 A1 | 10/1983 |
| FR | 1 557 353 A | 2/1969 |
| FR | 2 969 659 A1 | 6/2012 |
| WO | 2010/051855 A1 | 5/2010 |

OTHER PUBLICATIONS

Preliminary French Search Report for FR1451330 (dated Nov. 11, 2014).
International Search Report for PCTEP2015053520 (dated Jan. 6, 2015).

* cited by examiner

*Primary Examiner* — James Fiorito
(74) *Attorney, Agent, or Firm* — Miles & Stockbridge P.C.

(57) ABSTRACT

A method to activate $U_3O_8$ for conversion of this uranium oxide to hydrated $UO_4$ via reaction with hydrogen peroxide $H_2O_2$, wherein the following successive steps are performed:
a) an aqueous suspension is prepared containing a powder of $U_3O_8$ and hydrogen peroxide;
b) the aqueous suspension containing a powder of $U_3O_8$ and hydrogen peroxide is contacted with ozone, whereby an aqueous suspension is obtained of a powder of activated $U_3O_8$;
c) optionally the powder of activated $U_3O_8$ is separated from the aqueous suspension.

A method to convert $U_3O_8$ to hydrated $UO_4$ of formula $UO_4$, $nH_2O$ where n is 2 or 4, comprising at least one step at which hydrogen peroxide $H_2O_2$ is added to the aqueous suspension of a powder of activated $U_3O_8$ obtained at the end of step b) of the activation method or to an aqueous suspension prepared by placing in suspension in water the powder of activated $U_3O_8$ obtained at the end of step c) of the activation method.

29 Claims, 1 Drawing Sheet

METHOD FOR ACTIVATING $U_3O_8$ WITH A VIEW TO CONVERTING SAME INTO HYDRATED $UO_4$

TECHNICAL FIELD

The invention concerns a method for activating or reactivating $U_3O_8$ for conversion of this uranium oxide to hydrated uranium peroxide $UO_4$.

The technical field of the invention can generally be defined as the conversion of concentrates of uranium-containing ores, particularly in the form of uranium oxide $U_3O_8$, to hydrated uranium oxide, then to $UF_4$, and finally to $UF_6$.

STATE OF THE PRIOR ART

The treatment of uranium ores allows the extraction of uranium from the ores, purification and combination thereof to obtain a product known as a concentrate or uranate or «Yellow Cake» that is rich in uranium, for example comprising more than 70% by weight of uranium.

Uranium ores are first crushed and then milled and subjected to an operation to place the uranium in solution using a base or acid such as e.g. sodium carbonate or sulfuric acid, called attack or leaching.

After purification and concentration of the solutions derived from leaching of the ore, the uranium is recovered in the form of uranium-containing solutions that are generally acid in a sulfates medium for example.

These solutions can also be in a chloride, ammonia, nitrate or carbonate medium depending on the previous purification-concentration step.

The uranium concentrate or yellow cake is obtained from these uranium-containing liquor, solutions, via precipitation using precipitation reagents such as sodium hydroxide, magnesia, ammonia, ammonium uranyl tricarbonate and hydrogen peroxide, filtration, drying and calcining. The calcining step is conducted at high temperature to remove a maximum amount of sulfates via thermal decomposition. This calcining step at high temperature leads to uranium concentrates having a small specific surface area.

Depending on the precipitating reagent used the uranium concentrate or yellow cake will be sodium uranate—, magnesium uranate—, ammonium diuranate—, ammonium uranyl tricarbonate—, or uranium peroxide—, based, respectively.

At the current time the fuel of water nuclear reactors generally consists of uranium oxide $UO_2$, slightly enriched with isotope $^{235}U$, generally in the proportion of 3% to 5%.

This enriched uranium oxide $UO_2$ is prepared first by enriching gaseous uranium hexafluoride using a process such as gaseous diffusion or gaseous ultracentrifugation.

The chemical conversion of uranium concentrates such as yellow cake derived from the treatment of uranium ores prepared as described in the foregoing, is essentially intended to convert the uranium oxides contained in these concentrates to $UF_4$ then to $UF_6$.

Uranium-containing concentrates such as yellow cake prepared as described above but also other uranium-containing concentrates containing uranium trioxide or uranium octoxide are not suitable for direct conversion in particular to $UF_6$.

First they contain too many impurities for the subsequent isotopic separation step (also called enrichment) in relation to ASTM standards on enrichment (the presence of some components can be prohibitive for the fluorination process), and secondly their small specific surface area leads to very slow direct conversion kinetics.

The uranium-containing concentrates are reduced to $UO_2$ which is then hydrofluorinated to $UF_4$ and finally fluorinated to impure $UF_6$.

With the so-called «dry route» conversion method, purification is chiefly conducted at the end of the method and the liquid $UF_6$ is distilled under pressure in columns in series.

However most uranium-containing concentrates, and in particular uranium-containing concentrates derived from the treatment of ores, have insufficient reactivity for the reduction/hydrofluorination step leading to $UF_4$.

It is therefore necessary to perform an additional step to pre-treat the uranium-containing concentrates for purification and activation thereof before the reduction/hydrofluorination step, and to improve the kinetics and conversion rate of this step.

This pre-treatment step such as can be carried out using various chemical methods (via action of an agent such as e.g., contacting uranium-containing concentrates with water and sulfuric acid), thermal methods (reduction, oxidation) or physical methods (milling) which all allow the reactivity of the uranium oxides to be increased upon reduction/hydrofluorination.

These methods can be performed either before reduction by acting on the oxide precursors or on the synthesis mode thereof as described in FR-A-1 557 353, or in parallel with reduction of the oxides to $UO_2$, or by modifying the hydrofluorination parameters.

The pre-treatment step can also consists in an activation and purification of the oxides by performing their conversion to hydrated uranium peroxide which is then calcined to give $UO_3$ which is reduced to $UO_2$. The $UO_2$ is then converted to $UF_4$ during the hydrofluorination step.

For example, FR-A1-2 969 659 describes a conversion method of $UO_3$ or $U_3O_8$ to hydrated $UO_4$, which uses hydrogen peroxide.

More specifically this method comprises the following successive steps:

a) preparing an aqueous suspension of a $UO_3$ powder and/or a $U_3O_8$ powder;

b) adding hydrogen peroxide $H_2O_2$ to the aqueous suspension of $UO_3$ and/or $U_3O_8$ powder, conversion of $UO_3$ and/or $U_3O_8$ to hydrated $UO_4$ and precipitation, crystallisation of the hydrated $UO_4$ in the suspension;

c) recovering the precipitate, crystals of hydrated $UO_4$;

wherein the addition of $H_2O_2$ to the aqueous suspension is conducted so that the suspension contains a stoichiometric excess of $H_2O_2$ relative to the stoichiometry of the reaction starting from $UO_3$ or of the reaction starting from $U_3O_8$, and the pH of the suspension is maintained at steps a) and b) at a value between 2 and 3, for example by adding an acid such as oxalic acid or sulfuric acid to the suspension.

This method does not contain any prior dissolution step of $U_3O_8$ or $UO_3$ before carrying out their conversion via addition of hydrogen peroxide, and this conversion is conducted in a suspension and not in a solution.

The hydrated uranium peroxide prepared using this method has a sufficiently low impurities content so that this hydrated uranium peroxide is able to be converted directly to $UF_4$ then to $UF_6$. In addition, this hydrated uranium peroxide has a large specific surface area and a high reactivity for rapid conversion to $UF_4$.

However, it has been ascertained that some uranium-containing ore concentrates in particular the uranium-containing ore concentrates in the form of uranium oxides $U_3O_8$ cannot be converted to hydrated $UO_4$ using the method of document FR-A1-2 969 659, or only with very long reaction times and by using significant excess of reagents, in particular sulfuric acid, which generate extensive amounts of waste.

To improve the reaction kinetics, several solutions could be envisaged to activate these uranium-containing concentrates and increase the reactivity thereof.

A first solution would be to increase the temperature of the medium, and a second solution would be to increase the specific surface area of the ore concentrates by milling said ore concentrates.

The first solution can only be used over a narrow temperature range, namely 20° C. to 40° C. Over and above 40° C., the degradation reaction of the oxygenated water (hydrogen peroxide solution)—the reagent needed for conversion to $UO_4$—becomes predominant and high excesses of this reagent must be added.

In addition, over this narrow temperature range the improvement in kinetics is small.

The second envisaged solution, namely to increase the specific surface area of the ore concentrates by milling thereof, requires an additional step in the conversion method. In addition, this step requires the handling of fine powders which give rise to increased risks of contamination.

In the light of the foregoing there is therefore a need for a method allowing the activation or reactivation of $U_3O_8$ for conversion of this uranium oxide to hydrated $UO_4$ using oxygenated water, in particular by implementing the method described in FR-A1-2 969 659, and which does not have the disadvantages of activation techniques via temperature increase or prior milling as mentioned above.

In particular, there is a need for such an activation method which allows all ore concentrates (including those which cannot be converted using the method of document FR-A1-2 969 659) to be converted by oxygenated water (hydrogen peroxide solution) to hydrated uranium peroxide, in particular by applying the method of document FR-A1-2 969 659 with reduced reaction times and without large reagent excess.

This activation method must allow the preparation of activated $U_3O_8$ oxides which, via reaction with $H_2O_2$, give hydrated uranium peroxide having a low impurity content, in particular an impurity content sufficiently low for conversion of this hydrated uranium peroxide directly to $UF_4$ then to $UF_6$.

The hydrated $UO_4$ must fully or largely meet standard ASTM C-787 relating to the purity of hydrated $UO_4$ for conversion to $UF_6$, and must have a high specific surface area and high reactivity for conversion thereof to $UF_4$.

The goal of the present invention is to provide a method allowing the activation or reactivation of $U_3O_8$ for the conversion of these uranium oxides to hydrated $UO_4$, by oxygenated water (hydrogen peroxide solution), which meets all the needs and requirements listed above.

DESCRIPTION OF THE INVENTION

This goal and others are achieved, according to the invention, with a method to activate $U_3O_8$ for conversion of this uranium oxide to hydrated $UO_4$ by reaction with hydrogen peroxide $H_2O_2$, wherein the following successive steps are performed:

a) an aqueous suspension is prepared containing a powder of $U_3O_8$ and hydrogen peroxide;

b) the aqueous suspension containing a powder of $U_3O_8$ and hydrogen peroxide is contacted with ozone, whereby an aqueous suspension of a powder of activated $U_3O_8$ is obtained;

c) optionally, the powder of activated $U_3O_8$ is separated from the aqueous suspension.

Advantageously, during step b) a gas stream containing ozone is introduced and bubbled into the aqueous suspension containing a powder of $U_3O_8$ and hydrogen peroxide.

Advantageously, the ozone is bubbled in the aqueous suspension for a time of 1 to 10 hours, e.g. for 8 hours.

Advantageously, during step a) the $U_3O_8$ powder is added to a mixture of water and of an aqueous solution of hydrogen peroxide $H_2O_2$.

Advantageously, the gas stream containing ozone is a stream of air containing ozone or a stream of oxygen containing ozone, preferably at an ozone concentration of 1 to 500 $g/m^3$, more preferably 1 to 225 $g/m^3$, further preferably 75 to 225 $g/m^3$.

Advantageously, the concentration of the aqueous solution of hydrogen peroxide is 30% to 70% by weight.

Advantageously, the aqueous suspension prepared in step a) has a uranium concentration of 10 to 500 g/L, preferably 200 to 300 g/L, for example 250 g/L.

Advantageously, during step b) the molar ratio between ozone and $U_3O_8$ in the aqueous suspension is between 1 and 5.

Advantageously, during step b) the amount of hydrogen peroxide in the aqueous suspension is at least equal to the amount of ozone introduced into the aqueous suspension (i.e. the molar ratio between the amount of hydrogen peroxide introduced into to the aqueous suspension and the amount of ozone introduced into the aqueous suspension is at least=1).

Advantageously, said contacting can be performed under agitation.

Advantageously, the $U_3O_8$ oxide is in the form of a uranium-containing concentrate called Yellow Cake, or the $U_3O_8$ oxide is derived from the drying, then calcining of a uranium concentrate, for example a hydrated $UO_4$—, ammonium diuranate—, or uranium tricarbonate based, concentrate, obtained by precipitation in a reactor, especially in a fluidised bed reactor, from a uranium-containing solution.

The activation method according to the invention has never been described or suggested in the prior art.

In particular, the fundamental characteristic of the activation method according to the invention, namely the characteristic according to which a powder of $U_3O_8$ is contacted both with an aqueous solution of hydrogen peroxide and with ozone to thereby obtain a powder of activated $U_3O_8$, is neither described nor suggested in the prior art.

The method of the invention is an «activation» method. The method of the invention, by means of the joint action of hydrogen peroxide and of ozone, surprisingly allows the reactivity of this uranium oxide $U_3O_8$ to be increased when subsequently reacted with hydrogen peroxide to prepare hydrated uranium peroxide $UO_4$.

Without wishing to be bound by any theory, it would seem that the ozone molecules react with the hydrogen peroxide molecules to form OH. radicals which react with the uranium oxide and cause activation thereof.

This increase in the reactivity of uranium oxide $U_3O_8$ is partly due to an increase in specific surface area of the powders of this oxide, generally by a factor of at least 2, preferably by a factor of 2 to 4, more preferably by a factor of 2 to 10. This increase in the specific surface area of the powder of activated $U_3O_8$ oxide powder prepared using the method of the invention, compared with the oxide powders before treatment with the method of the invention, is illustrated in Example 2 and on FIG. 3.

With this increase in reactivity, the kinetics of conversion of the uranium oxides during their subsequent reaction with hydrogen peroxide to prepare hydrated uranium peroxide $UO_4$ (for example using the method described in document FR-A1-2 969 659) are greatly improved. A large part of the uranium oxides present in the form of uranium oxide $U_3O_8$, is not converted to hydrated peroxide if no sulfuric acid is added or even if a moderate amount of sulfuric acid is added, even if the uranium oxide $U_3O_8$, is left to react with oxygenated water (hydrogen peroxide solution) for 24 h. Therefore up to 90% of the $U_3O_8$ is not converted when the method of document FR-A1-2 969 659 is applied with a $U_3O_8$ powder which has not been activated, whereas conversion reaches almost 100% when the method of document FR-A1-2 969 659 is applied with a powder of activated $U_3O_8$ prepared by the method according to the invention.

The method according to the invention ensures activation of the uranium oxides without having the shortcomings of the above-mentioned activation techniques via temperature increase or prior milling.

By means of the activation of the uranium oxides obtained with the method of the invention, all ore concentrates without exception (including those which cannot be converted when implementing the method of document FR-A1-2 969 659) can be converted by oxygenated water (hydrogen peroxide solution) to hydrated uranium peroxide with reduced reaction times for example of 8 hours or less, even 3 hours or less, and without large excesses of reagents (for example with a $H_2O_2/U$ molar ratio lower than 5, preferably lower than 3, or for example with a S/U molar ratio lower than 0.125 or even zero).

Therefore by means of the activation of the uranium oxides achieved with the method of the invention, the conversion of these uranium oxides to hydrated uranium peroxide using the method of document FR-A1-2 969 659 can be achieved with a limited amount of acid (namely for example a S/U molar ratio in the order of 0.02) such as sulfuric acid, even without acid. The amount of waste generated by the conversion method of the invention is therefore greatly limited.

In the same way, because of the activation of the uranium oxides achieved by the method of the invention, the conversion of these uranium oxides to hydrated uranium peroxide when applying the method of document FR-A1-2 969 659 can be carried out with a limited amount of complexing ions such as sulfate ions, even without complexing ions such as sulfate ions. Here again the amount of waste generated by the conversion method is largely limited.

Finally the method of the invention meets all the above-listed needs and requirements.

It is known that the use of ozone generally requires the setting-up of a system for destruction of excess ozone.

In the method of the invention the presence of hydrogen peroxide allows the destruction of ozone molecules to form OH. radicals.

The invention further concerns a method to convert $U_3O_8$ to hydrated $UO_4$ of formula $UO_4, nH_2O$ where n is 2 or 4, comprising at least one step wherein hydrogen peroxide $H_2O_2$ is added to the aqueous suspension of a powder of activated $U_3O_8$ obtained at the end of step b) of the activation method described above, or to an aqueous suspension prepared by placing in suspension in water the powder of activated $U_3O_8$ obtained at the end of step c) of the above-described activation method.

Advantageously, in one preferred embodiment the conversion method is the method described in document FR-A1-2 969 659, that is slightly modified however regarding the value at which the pH is maintained in the suspension at steps a1) and b1), and it comprises the following successive steps:

a1) adding hydrogen peroxide $H_2O_2$ to the aqueous suspension of a powder of activated $U_3O_8$ obtained at the end of step b) of the activation method according to the invention, or to an aqueous suspension prepared by placing in suspension (suspending) in water the powder of activated $U_3O_8$ obtained at the end of step c) of the activation method of the invention, converting of $U_3O_8$ to hydrated $UO_4$, precipitating and crystallizing the hydrated $UO_4$ in the suspension;

b1) recovering the precipitate, crystals, of hydrated $UO_4$;

c1) optionally, washing the recovered precipitate, crystals of hydrated $UO_4$;

d1) optionally, repeating step c1);

e1) optionally, drying the precipitate, the crystals;

wherein the addition of $H_2O_2$ to the aqueous suspension is conducted so that the suspension contains a stoichiometric excess of $H_2O_2$ relative to the stoichiometry of the reaction starting from $U_3O_8$:

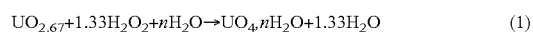

$$UO_{2.67}+1.33H_2O_2+nH_2O \rightarrow UO_4,nH_2O+1.33H_2O \qquad (1)$$

and the pH of the suspension in steps a1) and b1) is held at a value between 1 and 3.

The conversion method of the invention differs fundamentally from prior art conversion methods and in particular from the method subject of document FR-A1-2 969 659 in that it is applied to a specific powder of $U_3O_8$ which is a powder activated by the activation method of the invention.

The conversion method of the invention has a whole series of advantages most of which have already been set forth above, which are inherently due to the use in this method of a powder of $U_3O_8$ activated by the activation method of the invention.

The conversion method of the invention does not have the drawbacks of the prior art conversion methods and in particular of the method subject of document FR-A1-2 969 659 whilst having all the advantages thereof, and overcomes the problems of the method of this document.

Advantageously, the addition of $H_2O_2$ to the aqueous suspension is conducted so that the suspension contains a stoichiometric excess of $H_2O_2$ relative to the stoichiometry of the reaction starting from $U_3O_8$:

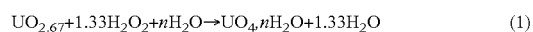

$$UO_{2.67}+1.33H_2O_2+nH_2O \rightarrow UO_4,nH_2O+1.33H_2O \qquad (1)$$

and the pH of the suspension in steps a1) and b1) is held at a value between 1 and 3 (1 and 3 included).

Advantageously, the pH of the suspension is adjusted during step a1) to a value of between 1 and 3 by adding an acid to the suspension.

Advantageously, said acid is selected from among oxalic acid, sulfuric acid and the mixtures thereof.

Advantageously, the stoichiometric execs of $H_2O_2$ is more than 1.33 to 10 relative to the stoichiometry of the reaction (1).

Advantageously, the hydrogen peroxide is added in the form of an aqueous solution at a concentration of 30% to 70% by weight.

Advantageously, the aqueous suspension of $U_3O_8$ has a uranium concentration of 10 to 500 g/L, preferably 200 to 300 g/L, for example 250 g/L.

Advantageously, steps a1) and b1) can be conducted under agitation.

Advantageously as indicated above, since a powder of activated $U_3O_8$ is used at step a1) and/or step b1), no complexing anions such as sulfate anions or oxalate anions are added to the suspension, or only a small amount of these complexing anions is added, lower than the amount added in the method of document FR-A1-2 969 659.

Advantageously, the duration of step b1) is selected so that the conversion of activated $U_3O_8$ to hydrated $UO_4$ is complete or substantially complete e.g. higher than 99%, even than 99.9%.

In one embodiment, step b1) may comprise the following successive steps b2) and b3):

b2) adding hydrogen peroxide $H_2O_2$ to the aqueous suspension of a powder of activated $U_3O_8$, preferably under agitation, then stopping the addition;

b3) ripening of the suspension, preferably under agitation.

Advantageously, the duration of said step b2) may be from 1 to 8 hours, preferably less than 8 hours, more preferably between 1 and 3 hours, and the duration of step b3) may be from 1 to 24 hours, preferably from 1 to 3 hours.

In another embodiment the addition of hydrogen peroxide $H_2O_2$ is carried out throughout the entire duration of step b1), i.e. step b3) is omitted.

In this embodiment the duration of step b1) is generally from 1 to 8 hours, preferably less than 8 hours, more preferably from 1 to 5 hours.

In this case in particular, the water of the suspension can be removed by evaporation and the precipitate, crystals of hydrated $UO_4$, is then recovered in the form of a dry solid for example having an humidity lower than 7% by weight, generally consisting of $UO_4,2H_2O$, or else during step c1) the precipitate, crystals of hydrated $UO_4$, is separated from the suspension by a solid/liquid separation operation, for example by a filtration or centrifugation operation, in the form of a wet solid having an humidity of 30% to 80% by weight, for example, and generally consisting of $UO_4$, $4H_2O$.

On the other hand, evaporation will generally not allow removal of impurities.

Advantageously, said wet solid is washed at least once with a washing liquid.

Advantageously, said washing liquid is selected from among demineralised water; acidified aqueous solutions, preferably acidified to a pH of 1 to 3, for example using sulfuric acid; solutions containing a complexing agent for the impurities contained in the wet solid.

Advantageously the washing ratio, defined by the ratio of the mass of the washing liquid to the mass of the wet solid, is 1 to 30, preferably 1 to 10.

The conversion method of the invention can be defined as a direct conversion method without prior dissolving of activated $U_3O_8$ through the addition of $H_2O_2$ to an aqueous suspension of a powder of activated $U_3O_8$ The conversion method of the invention, which does not comprise any prior dissolution step of the uranium, does not have all the disadvantages due to this prior dissolution step. In particular, the conversion method of the invention avoids the formation of numerous impurities which can prove to be extremely hampering for the subsequent conversion steps of hydrated $UO_4$, for example to $UF_4$.

The conversion method of the invention is also defined in its preferred embodiment—which substantially corresponds to the method subject of document FR-A1-2 969 659—by the fact that the suspension contains a stoichiometric excess of $H_2O_2$ relative to reactions (1) et (2), which allows complete or near-complete conversion to be obtained.

The conversion method of the invention in its preferred embodiment is further characterized in that the pH of the suspension at steps a1) and b1) is maintained at a specific value of between 1 and 3 inclusive.

The selection of this very narrow pH range firstly allows avoiding of risks of re-dissolution of the hydrated $UO_4$ at pH values that are too acid, in general lower than 1, and secondly avoids risks of the formation of compounds other than hydrated $UO_4$ at more basic pH values, in general higher than 3, and the precipitation of impurities following uranium.

The conversion method of the invention, in particular in its preferred embodiment, allows the preparation of uranium peroxide or hydrated uranium peroxide having a low impurity content, in particular an impurity content that is sufficiently low so that this uranium peroxide or this hydrated uranium peroxide is able to be directly converted to $UF_4$ and then to $UF_6$.

The conversion method of the invention particularly allows the preparation of hydrated $UO_4$ which fully or largely meets standard ASTM C-787 relating to the purity of hydrated $UO_4$ for conversion to $UF_6$.

The conversion method of the invention also allows the preparation of uranium peroxide having high reactivity for rapid conversion to $UF_4$.

The conversion method of the invention effectively allows hydrated $UO_4$ to be obtained having a large specific surface area, possibly reaching 30 m$^2$/g.

The invention will be better understood on reading the following detailed description, in connection in particular with preferred embodiments of the methods of the invention. This description is non-limiting and is given for illustration purposes with reference to the appended drawings.

DETAILED DESCRIPTION OF PARTICULAR EMBODIMENTS

Figure 1:
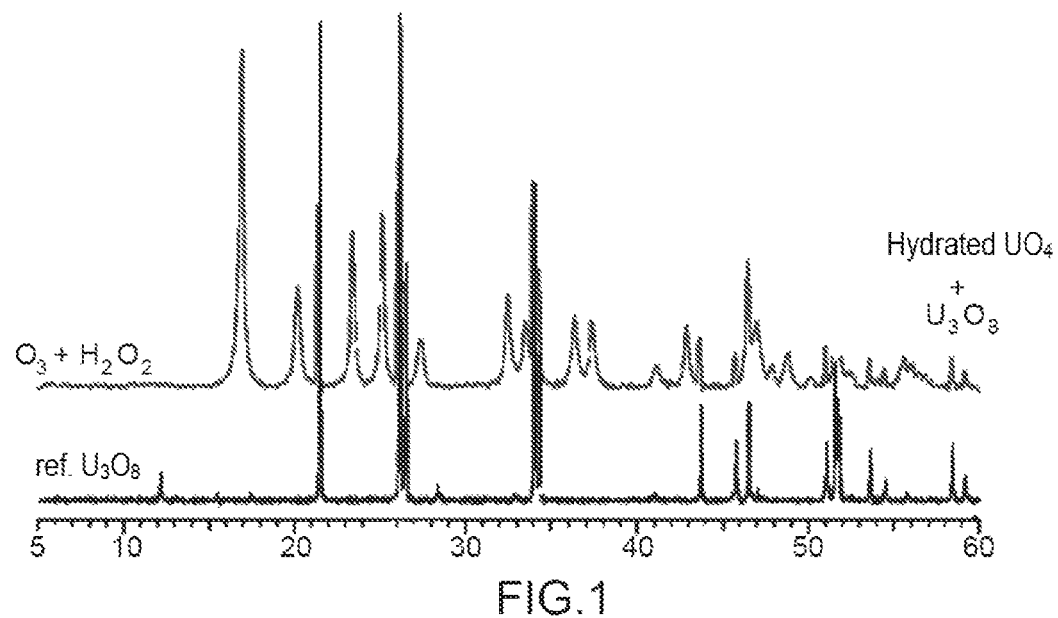
FIG. 1 is a graph showing the diffractogram obtained upon X-ray diffraction analysis of the activated solid obtained in Example 2 via action, according to the activation method of the invention, of a gas stream containing ozone on an aqueous suspension of $U_3O_8$ oxide further containing hydrogen peroxide.

In the first step of the activation method of the invention (step a)), an aqueous suspension is prepared containing a powder of uranium octoxide $U_3O_8$, and hydrogen peroxide.

This suspension can be prepared by adding a powder of $U_3O_8$ to a solution containing hydrogen peroxide.

This solution can be prepared by mixing water and oxygenated water—i.e an aqueous solution of hydrogen peroxide—to obtain an aqueous solution having a hydrogen peroxide concentration of 0.5 to 10% by weight. Oxygenated waters generally have a hydrogen peroxide concentration of 30% to 70% by weight.

The concentration of oxide(s) in the aqueous suspension is generally 10 to 500 gU/L, preferably 200 to 300 gU/L.

The method of the invention can be implemented using all kinds of uranium octoxides $U_3O_8$, irrespective of their origin and the form thereof.

For example these oxides can be in the form of concentrates known as Yellow Cake.

These oxides may also derive from the drying, and then calcining of an uranium concentrate, for example an hydrated $UO_4$—, ammonium diuranate—, or uranium tricarbonate based, concentrate, by precipitation in a reactor, in particular a fluidised bed reactor, from a uranium-containing solution.

One method to prepare a powder of $U_3O_8$ by drying and calcining a hydrated $UO_4$—, ammonium diuranate—or uranium tricarbonate based uranium concentrate previously obtained by precipitation in a fluidised bed is described in document WO-A1-2010/051855 to the description of which reference can be made.

The $U_3O_8$ powders obtained in this document, on account of the preparation of the uranium concentrate in a fluidised bed, have particularly advantageous properties.

Oxides in the form of concentrates called Yellow Cake, or oxides derived from the drying and calcining of a uranium concentrate preferably obtained via precipitation in a fluidised bed are generally in the form of powders and can be used directly in the method of the invention and can be placed in suspension in water.

However it may be advantageous to carry out prior milling of the oxide powders to obtain a particularly fine particle size e.g. in the order of one micrometer.

The powders placed in suspension generally contain impurities and the conversion method of the invention following the activation method has the particular objective of reducing the content of these impurities in the hydrated uranium peroxide obtained.

Preferably, with the conversion method of the invention it is sought to obtain hydrated uranium peroxide having an impurity content compatible with conversion thereof to $UF_6$ and having an impurity content meeting standard ASTM C-787.

The $U_3O_8$ powder may contain one or more of the following impurities, for example in the following contents expressed in ppm/U:

As: 102
Ca: 1383
Si: 2312
Zr: 316
$SO_4$: 29205
Mo: 1109
Na: 20

Obviously, the aqueous suspension containing a powder of uranium octoxide $U_3O_8$ and hydrogen peroxide may be prepared in other manners, for example it is possible to start by preparing an aqueous suspension containing a powder of uranium octoxide $U_3O_8$ by adding the powder(s) to non-oxygenated water, water not containing hydrogen peroxide (or vice versa), then by adding oxygenated water to this aqueous suspension.

During the second step of the conversion method of the invention (step b)) the aqueous suspension containing a powder of $U_3O_8$, and hydrogen peroxide, is contacted with ozone, whereby an aqueous suspension is obtained of a powder of activated $U_3O_8$.

The contacting of the aqueous suspension with ozone is generally conducted by introducing and bubbling a gas stream containing ozone into the aqueous suspension containing a $U_3O_8$ powder and hydrogen peroxide.

The ozone-containing gas stream is generally a stream of an oxygen-containing gas, such as air or oxygen, containing ozone, generally at a concentration of 1 to 500 $g/m^3$.

Such a stream of gas containing ozone may be produced by an ozonator or ozone generator in which ozone is created by subjecting an oxygen-containing gas such as air, to a corona-effect discharge which converts part of the oxygen of the gas to ozone.

In general the ozone is bubbled through the aqueous suspension for a time of 1 to 10 hours, for example 8 hours.

In general during step b) the molar ratio between the ozone and $U_3O_8$ in the aqueous suspension is between 1 and 5.

In general, as indicated above, during step b) the amount of hydrogen peroxide in the aqueous suspension is at least equal to the amount of ozone introduced into the aqueous suspension (molar ratio of 1 or higher).

Steps a) and b) are generally performed under agitation.

Therefore the reactor used to implement the method of the invention and in particular to perform steps a) and b) is generally a perfectly agitated reactor generally equipped with a propeller agitator e.g. a three-blade propeller.

The reactor may also be provided with counter-blades or deflectors.

The volume of the reactor may be easily chosen by the man skilled in the art as a function of the volume of suspension it is desired to prepare.

The reactor may further be provided with sensors and devices to measure parameters values such as pH and temperature of the suspension.

The suspension may be prepared by introducing a known amount of powder of oxide(s) into the reactor.

To this known amount of oxide there is added the amount of water and oxygenated water (hydrogen peroxide solution) desired to obtain a suspension having the desired concentration.

The powder and the mixture of water and oxygenated water (hydrogen peroxide solution) having been introduced into the reactor, agitation is started to place the powder(s) in suspension in the mixture of water and oxygenated water (hydrogen peroxide solution).

Agitation speed is set to allow efficient placing in suspension of the powder. A gas stream containing ozone is then bubbled through the aqueous suspension thus obtained under the conditions detailed above.

Optionally, during an optional step c), the powder of activated $U_3O_8$ is separated from the aqueous suspension using any suitable solid/liquid separation method e.g. filtration.

The aqueous suspension of a powder of activated $U_3O_8$ obtained at the end of step b) of the activation method may be used directly in the method to convert $U_3O_8$ to hydrated $UO_4$ of formula $UO_4$, $nH_2O$ where n is 2 or 4, such as the method of document FR-A1-2 969 659. For example, this suspension also called a pulp may be conveyed directly from the reactor in which the activation method has been carried out, at the end of said activation process, to the reactor in which the conversion method is performed.

Or else, for this conversion method, such as the method of document FR-A1-2 969 659, an aqueous suspension may be used that is prepared by placing in suspension in water the powder of activated $U_3O_8$ obtained at the end of the separation step c) of the activation method of the invention.

The reactor used to implement the conversion method of the invention and to carry out steps a1) and b1) in particular is generally a perfectly agitated reactor generally equipped with a propeller agitator e.g. a three-blade propeller.

The reactor may also be provided with counter-blade or deflectors.

The volume of the reactor can easily be chosen by the man skilled in the art as a function of the volume of suspension it is desired to prepare.

The reactor may further by provided with sensors and devices to measure parameter values such as pH and temperature of the suspension.

As already indicated above, the aqueous suspension of a powder of activated $U_3O_8$ obtained at the end of step b) of the activation method may be used directly in the method to convert $UO_3$ and/or $U_3O_8$ to hydrated $UO_4$ of formula $UO_4$, $nH_2O$ where n is 2 or 4, such as the method of document FR-A1-2 969 659 and, in this case, this suspension also called a pulp may be conveyed directly from the reactor in which the activation method was carried out, at the end of said activation method, to the reactor in which the conversion method is to be conducted.

Or else, in this conversion method, such as the method of document FR-A1-2 969 659, an aqueous suspension may be used that is prepared by placing in suspension in water the powder of activated $U_3O_8$ obtained at the end of the separation step c) of the activation method of the invention.

The suspension is generally prepared by adding a known amount of activated $U_3O_8$ powder to the reactor.

To this known amount of activated oxide is then added the amount of demineralised water desired to obtain a suspension having the desired concentration.

Obviously, it is also possible to start by introducing demineralised water in the reactor then adding the powder of activated oxide to the demineralised water.

The concentration of activated oxide in the suspension is generally such as defined above, namely a uranium concentration of 10 to 500 g/L, preferably 200 to 300 g/L, for example 250 g/L.

The pH of the demineralised water is adjusted to a value of 1 to 3 through the addition of an acid or of a mixture of acids. If, for the conversion method, the suspension obtained in step b) of the activation method is used directly, the acid is added to this suspension.

This or these acid(s) may be any mineral or organic acid.

As will be seen below, an acid having an anion additionally having a complexing action which improves reaction kinetics is preferred.

The preferred acids are sulfuric acid, oxalic acid and the mixtures thereof.

Other acids may be used to adjust pH but sulfuric acid has the advantage of not introducing any elements which may hamper the nuclear purity of $UF_6$ since there are no ASTM specifications relating to sulfur.

In addition, the conversion rate to hydrated $UO_4$ is limited by the formation of a reaction intermediate (uranyl ion $UO_2^{2+}$) but may be accelerated through the use of at least one complexing anion such as the sulfate anion or the oxalate anion or the citrate anion.

It is therefore possible to add a compound providing this complexing anion during step a1) and/or step b1) of the conversion method of the invention. With regard to sulfur the optimal S/U ratio is lower than 0.125, and is in the order of 0.02 for example.

Preferably sulfuric acid is used as compound providing the complexing anion for suspending the uranium oxide in order to obtain fast conversion kinetics.

The powder and demineralised water having been introduced into the reactor, agitation is started to suspend the powder of activated oxide in the demineralised water.

The agitation speed is set to allow efficient suspending of the powder or to maintain the powder in suspension if, for the conversion method, use is made of the suspension obtained at the end of step b) of the activation method.

Agitation is continued throughout the entire duration of conversion to hydrated $UO_4$ to allow complete crystallisation of the starting uranium.

It is then possible to start adding hydrogen peroxide into the suspension.

The adding of hydrogen peroxide may be carried out using any suitable device allowing to control the flow rate of hydrogen peroxide introduced into the reactor.

The addition of hydrogen peroxide is also preferably conducted under agitation.

The hydrogen peroxide is generally added in the form of an aqueous solution at a concentration of 30% to 70% by weight.

The total amount of hydrogen peroxide added, is, according to the invention, such that the stoichiometric excess of $H_2O_2$ relative to the starting uranium is more than 1.33 to 10 relative to the stoichiometry of following reaction (1):

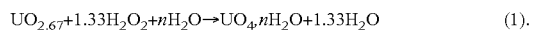

$$UO_{2.67}+1.33H_2O_2+nH_2O \rightarrow UO_4, nH_2O+1.33H_2O \qquad (1).$$

The reaction between the oxide and hydrogen peroxide is exothermal and an increase in temperature of the bath is ascertained of about 10° C. for example.

In one embodiment, the following successive steps b2) and b3) are performed:
b2) adding, as described above, hydrogen peroxide $H_2O_2$ to the aqueous suspension of $U_3O_8$ powder, preferably under agitation, then stopping the addition;
b3) ripening of the suspension, preferably under agitation.

During step b2), it can be estimated that some conversion to hydrated uranium peroxide occurs but this conversion is not complete.

Step b2) can be termed a nucleation, crystallisation, formation of crystallites of hydrated uranium peroxide, step.

During step b3), conversion is continued until the conversion of $UO_3$ and/or $U_3O_8$ to hydrated $UO_4$ is complete or substantially complete, for example higher than 90%, even 99.9%.

Step b3) can be termed a ripening, growth of the crystallites obtained during step b2), step.

The duration of said step b2) may be 1 to 8 hours, preferably 1 to 3 hours, and the duration of step b3) may be 1 to 24 hours, preferably 1 to 3 hours.

The total duration of steps b2) and b3) is such that the conversion to hydrated uranium peroxide is complete or substantially complete.

In another embodiment, no ripening step is performed after step b2), and step b3) is omitted.

It is to be noted that during the reaction of oxygenated water (hydrogen peroxide solution) with the oxides, the pH varies but globally remains stable, constant, at the value at which it had been adjusted through the addition of acid before the addition of oxygenated water, which means that it is generally not necessary to add more acid during step b) to control pH at the desired value.

It may be estimated that some regulation of pH is induced through the addition of $H_2O_2$ to $U_3O_8$.

At the end of the reaction, since conversion is complete or substantially complete, the pH generally stabilises at a value between 1 and 3.

At the end of step b1) the conversion to hydrated uranium peroxide being complete or substantially complete, the precipitate, the crystals of hydrated $UO_4$, is recovered, generally in the form of tetrahydrated $UO_4, 4H_2O$ or optionally in the form of dihydrated $UO_4, 2H_2O$.

In one variant of recovery step c1) it is possible to recover, collect the precipitate, crystals of hydrated $UO_4$, by separating them from the suspension via a liquid-solid separation operation in the form of a wet solid, for example having an humidity of 30% to 80% by weight, also called a cake.

The crystals of hydrated $UO_4$ recovered in this variant are generally crystals of $UO_4, 4H_2O$.

This liquid-solid separating operation may be a filtering operation of the suspension.

This filtering operation may be conducted in a vacuum or under centrifugal force.

The recovered wet solid may be collected and then washed with a washing liquid.

Said washing liquid may be demineralised water or an aqueous solution, acidified, preferably at a pH of 2 to 3, for example with sulfuric acid.

As washing liquid it is also possible to use an aqueous solution, preferably at a pH of 2 to 3, of an anion complexing the impurities contained in the wet solid such as those already mentioned above.

Sulfuric acid has the advantage of acting both as acidifying agent and as complexing agent due to sulfate anions.

The washing operation can be repeated 1 to 10 times depending on the desired impurity content of the uranium peroxide.

Advantageously the washing ratio defined as the ratio of mass of washing liquid (for the total number of washings) to the mass of wet solid is 1 to 30, preferably 1 to 10, to limit the volumes of water required for washing.

The method of the invention may optionally comprise a drying step of the recovered crystals of hydrated $UO_4$.

This drying step is generally conducted at a temperature of 60° C. to 100° C. for a time of 1 to 24 hours.

During this step the recovered hydrated uranium peroxide is converted to $UO_4, 2H_2O$ if it is $UO_4, 4H_2O$.

The hydrated uranium peroxide obtained has high reactivity for rapid conversion to $UF_4$.

For example a conversion rate of uranium to $UF_4$ of at least 90% is obtained within 800 seconds.

The conversion method of the invention allows hydrated $UO_4$ to be obtained having a high specific surface area possibly reaching 30 m²/g.

The impurity contents of the final peroxide are lower than that of the peroxides obtained using prior art methods and mostly conform to standard ASTM C-787.

The invention is now described with reference to the following examples that are non-limiting and given for illustration purposes.

EXAMPLES

In the following examples a description is given of the conversion of non-activated $U_3O_8$ to hydrated $UO_4$ via reaction with hydrogen peroxide alone (Example 1, comparative); of the activation of $U_3O_8$ according to the invention using a mixture of ozone and oxygenated water (hydrogen peroxide solution); and finally of the conversion of the activated $U_3O_8$ obtained in Example 2 by applying the conversion method of the invention (Example 3).

Example 1 (Comparative Example)

0.5 g of $U_3O_8$ are placed in suspension in a flask containing 10 mL of water. Hydrogen peroxide is added to the suspension of $U_3O_8$ to reach a molar concentration of 1 mol/L of $H_2O_2$. Agitation is continued for 24 h.

On completion of the test, the suspension is filtered and the solid obtained is analysed. A black solid is obtained.

The solid is analysed by X-ray diffraction analysis and the diffractogram obtained shows the conversion of $U_3O_8$ to hydrated $UO_4$.

Under these conditions the conversion of $U_3O_8$ to hydrated $UO_4$ is low, in the order of 10%.

Example 2

0.5 mmol of $U_3O_8$ are placed in suspension in a flask containing 10 mL water and 0.15 mL 30% oxygenated water (hydrogen peroxide solution). A gas stream containing ozone is passed through the suspension of $U_3O_8$ for 8 hours. The ozone is generated by an OZ 1000-L ozonator. The average concentration of ozone measured is 4.5 g/m³.

At the end of the test the suspension is filtered.

A grey solid is obtained.

This solid is analysed by X-ray diffraction (FIG. 1). The diffractogram shows the presence of a mixture of $U_3O_8$ and hydrated $UO_4$, a mixture containing in the order of 40% hydrated $UO_4$.

Observations under scanning electron microscope SEM and measurement of the specific surface area of the powder show a modified grain morphology.

Figure 2:
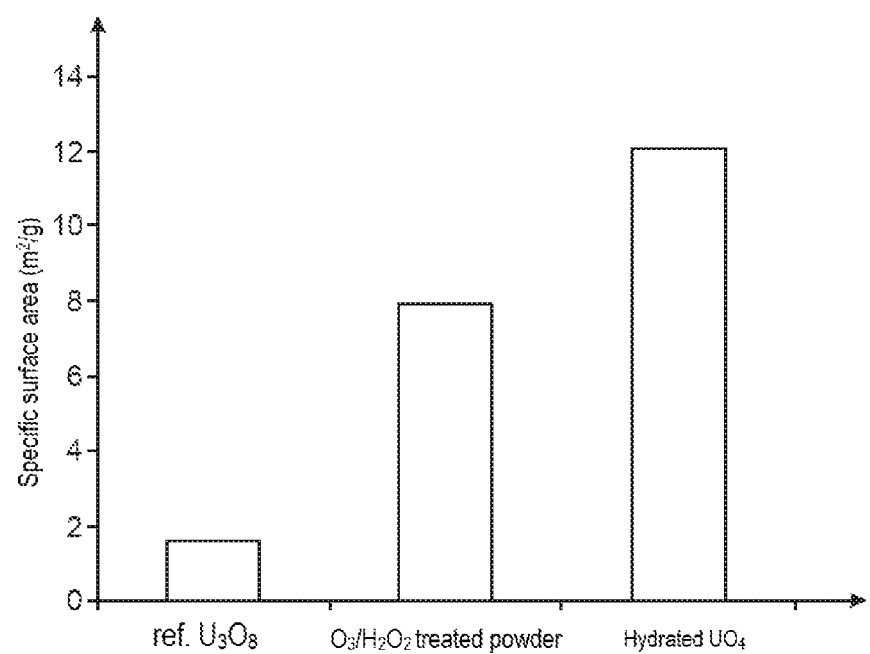
FIG. 2 is a graph giving the specific surface area (in m$^2$/g) of a reference $U_3O_8$ oxide not having undergone any activation treatment (on the left), of the powder of activated $U_3O_8$ obtained in Example 2 via action, according to the activation method of the invention, of a gas stream containing ozone on an aqueous suspension of $U_3O_8$ oxide further containing hydrogen peroxide (in the centre), and finally of the hydrated $UO_4$ obtained in Example 2 (on the right).

This treatment with $O_3/H_2O_2$ allows an improvement in the reactivity of the starting $U_3O_8$ by increasing the specific surface area of the solid (FIG. 2).

Example 3

The solid obtained in Example 2 is then able to react is a second step with oxygenated water (hydrogen peroxide solution) according to the conversion method of the invention implemented in accordance with document FR-A1-2 969 659 to produce 99.9% of hydrated uranium peroxide within 8 hours.

Through the use of activated $U_3O_8$ according to the invention, the conversion to hydrated $UO_4$ is therefore substantially complete.

The invention claimed is:

1. A method to activate $U_3O_8$ for conversion of the activated $U_3O_8$ to hydrated $UO_4$ via reaction with hydrogen peroxide $H_2O_2$, comprising the following successive steps:
   a) preparing an aqueous suspension containing a powder of $U_3O_8$ and hydrogen peroxide; and
   b) contacting the aqueous suspension, containing a powder of $U_3O_8$ and hydrogen peroxide, with ozone to obtain an aqueous suspension of a powder of activated $U_3O_8$.

2. The method according to claim 1 wherein during step b) a gas stream containing ozone is introduced and bubbled into the aqueous suspension containing a powder of $U_3O_8$ and hydrogen peroxide.

3. The method according to claim 2, wherein ozone is bubbled in the aqueous suspension for a time of 1 to 10 hours.

4. The method according to claim 2, wherein during step a) a $U_3O_8$ powder is added to a mixture of water and of an aqueous solution of hydrogen peroxide $H_2O_2$.

5. The method according to claim 2 wherein the gas stream containing ozone is a stream of air containing ozone, or a stream of oxygen containing ozone, at an ozone concentration of 1 to 500 g/m³.

6. The method according to claim 4, wherein the concentration of the aqueous solution of hydrogen peroxide is 30% to 70% by weight.

7. The method according to claim 1, wherein the uranium concentration of the aqueous suspension prepared in step a) is 10 to 500 g/L.

8. The method according to claim 1, wherein during step b) a molar ratio between ozone and $U_3O_8$ in the aqueous suspension is between 1 and 5.

9. The method according to claim 1, wherein during step b) an amount of hydrogen peroxide in the aqueous suspension is at least equal to an amount of ozone introduced into the aqueous suspension.

10. The method according to claim 1, wherein said contacting is conducted under agitation.

11. The method according to claim 1, wherein the powder of $U_3O_8$ oxide is obtained from drying and then calcining of an uranium concentrate obtained by precipitation in a reactor from a uranium-containing solution.

12. The method according to claim 1, further comprising:
converting $U_3O_8$ to hydrated $UO_4$ of formula $UO_4$, $nH_2O$ where n is 2 or 4, by adding hydrogen peroxide $H_2O_2$ to the aqueous suspension of a powder of activated $U_3O_8$ obtained at the end of step b, and recovering a dried solid.

13. The method according to claim 12, further comprising the following successive steps:
a1) adding hydrogen peroxide $H_2O_2$ to the aqueous suspension of a powder of activated $U_3O_8$ obtained at the end of step b), converting $U_3O_8$ to hydrated $UO_4$, and precipitating crystals of the hydrated $UO_4$ in the suspension; and
b1) recovering the crystals of the hydrated $UO_4$,
wherein the addition of $H_2O_2$ to the aqueous suspension is conducted so that the suspension contains a stoichiometric excess of $H_2O_2$ relative to the stoichiometry of the reaction starting from $U_3O_8$:

$$UO_{2.67} + 1.33H_2O_2 + nH_2O \rightarrow UO_4, nH_2O + 1.33H_2O \quad (1)$$

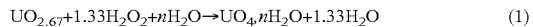

and the pH of the suspension in steps a) and b) is maintained at a value between 1 and 3.

14. The method according to claim 1, further comprising the step:
c) separating the powder of activated $U_3O_8$ from the aqueous suspension.

15. The method according to claim 3, wherein ozone is bubbled in the aqueous suspension for a time of 8 hours.

16. The method according to claim 5, wherein the gas stream containing ozone is a stream of air containing ozone, or a stream of oxygen containing ozone, at an ozone concentration of 1 to 225 g/m³.

17. The method according to claim 16, wherein the gas stream containing ozone is a stream of air containing ozone, or a stream of oxygen containing ozone, at an ozone concentration of 75 to 225 g/m³.

18. The method according to claim 7, wherein the uranium concentration of the aqueous suspension prepared in step a) is 200 to 300 g/L.

19. The method according to claim 18, wherein the uranium concentration of the aqueous suspension prepared in step a) is 250 g/L.

20. The method according to claim 11,
wherein the uranium concentrate is selected from among an hydrated $UO_4$-based concentrate, an ammonium diuranate-based concentrate and an uranium tricarbonate-based concentrate.

21. The method according to claim 14, further comprising:
converting $U_3O_8$ to hydrated $UO_4$ of formula $UO_4$, $nH_2O$ where n is 2 or 4, by adding hydrogen peroxide $H_2O_2$ to the aqueous suspension prepared by placing in suspension in water the powder of activated $U_3O_8$ obtained at the end of step c), and recovering a dried solid.

22. The method according to claim 21, further comprising the following successive steps:
a1) adding hydrogen peroxide $H_2O_2$ to the aqueous suspension prepared by placing in suspension in water the powder of activated $U_3O_8$ obtained at the end of step c), converting $U_3O_8$ to hydrated $UO_4$, and precipitating crystals of the hydrated $UO_4$ in the suspension; and
b1) recovering the crystals of the hydrated $UO_4$,
wherein the addition of $H_2O_2$ to the aqueous suspension is conducted so that the suspension contains a stoichiometric excess of $H_2O_2$ relative to the stoichiometry of the reaction starting from $U_3O_8$:

$$UO_{2.67} + 1.33H_2O_2 + nH_2O \rightarrow UO_4, nH_2O + 1.33H_2O \quad (1)$$

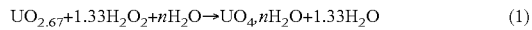

and the pH of the suspension in steps a) and b) is maintained at a value between 1 and 3.

23. The method according to claim 13, further comprising the step:
c1) washing the recovered crystals of the hydrated $UO_4$.

24. The method according to claim 23, further comprising repeating step c1).

25. The method according to claim 23, further comprising drying the washed crystals of the hydrated $UO_4$.

26. The method according to claim 22, further comprising the step:
c1) washing the recovered crystals of the hydrated $UO_4$.

27. The method according to claim 26, further comprising repeating step c1).

28. The method according to claim 26, further comprising drying the washed crystal of the hydrated $UO_4$.

29. The method of according to claim 11, wherein the reactor for precipitation is a fluidized bed reactor.

* * * * *